United States Patent
Carvalho et al.

(10) Patent No.: US 11,176,153 B2
(45) Date of Patent: Nov. 16, 2021

(54) CREATING CUSTOM CODE ON BACK-END AND FRONT-END USING EXTENSION POINTS

(71) Applicant: SAP SE, Walldorf (DE)

(72) Inventors: Eduardo Carvalho, Rio de Janeiro (BR); Alexandre Faltz, Porto Alegre (BR); Eduardo Berlitz, Porto Alegre (BR); Joachim Fitzer, Frankfurt (DE); Reinhold Kautzleben, Karlsruhe (DE); Willian Mendes, São Paulo (BR)

(73) Assignee: SAP SE, Walldorf (DE)

( * ) Notice: Subject to any disclaimer, the term of this patent is extended or adjusted under 35 U.S.C. 154(b) by 71 days.

(21) Appl. No.: 16/208,776

(22) Filed: Dec. 4, 2018

(65) Prior Publication Data

US 2020/0175026 A1 Jun. 4, 2020

(51) Int. Cl.
| | | |
|---|---|---|
| *G06F 16/25* | (2019.01) |
| *G06F 16/904* | (2019.01) |
| *G06F 9/451* | (2018.01) |
| *G06F 11/30* | (2006.01) |
| *G06F 40/194* | (2020.01) |

(52) U.S. Cl.
CPC .......... *G06F 16/252* (2019.01); *G06F 9/451* (2018.02); *G06F 11/3065* (2013.01); *G06F 16/904* (2019.01); *G06F 40/194* (2020.01)

(58) Field of Classification Search
CPC ...... G06F 16/252; G06F 9/451; G06F 16/904; G06F 40/194; G06F 11/3065; G06F 8/70; G06F 11/36; G06F 8/35; G06F 8/38; G06F 3/04815

See application file for complete search history.

(56) References Cited

U.S. PATENT DOCUMENTS

| | | | |
|---|---|---|---|
| 10,402,035 B1 * | 9/2019 | Jose | G06F 3/0482 |
| 2007/0061488 A1 * | 3/2007 | Alagappan | G06F 16/9577 |
| | | | 709/246 |
| 2008/0307010 A1 * | 12/2008 | Cullison | G06F 16/27 |
| 2012/0041990 A1 * | 2/2012 | Kreindlina | G06F 16/248 |
| | | | 707/805 |
| 2012/0210298 A1 * | 8/2012 | Hodgins | G06F 8/71 |
| | | | 717/113 |
| 2014/0115448 A1 * | 4/2014 | Owen | G06F 9/451 |
| | | | 715/249 |
| 2014/0280691 A1 * | 9/2014 | Buerner | H04L 67/02 |
| | | | 709/217 |
| 2015/0142855 A1 * | 5/2015 | Fast | G06F 16/27 |
| | | | 707/803 |

(Continued)

*Primary Examiner* — Mahelet Shiberou
(74) *Attorney, Agent, or Firm* — Sterne, Kessler, Goldstein & Fox P.L.L.C.

(57) ABSTRACT

Disclosed herein are system, method, and computer program product embodiments for providing extension points to alter a data source in a data pipeline. By providing a before-state-change extension point, a data orchestration system may allow connected clients to aggregate delta from a changed state source, allowing the data orchestration system to include only changed or added data in a transferred data state. By providing an after-state-change extension point, a data orchestration system may harness additional customizations, for example, effectively and efficiently handle changes to the state made by a viewing client following the transmission of a delta of changes.

20 Claims, 7 Drawing Sheets

(56) References Cited

U.S. PATENT DOCUMENTS

2019/0172499 A1\* 6/2019 Bodziony ............... G06F 16/70
2019/0235847 A1\* 8/2019 Nguyen .................... G06F 8/35
2019/0377817 A1\* 12/2019 McCluskey ........... H04L 65/602

\* cited by examiner

CREATING CUSTOM CODE ON BACK-END AND FRONT-END USING EXTENSION POINTS

BACKGROUND

Organizations may integrate vast amounts of data from across distributed data landscapes with a data orchestration system. By integrating, managing, and organizing data using a data orchestration system, an organization may extract maximum value from the data resources and accomplish programmatic, analytical, diagnostic, or other aims. Data orchestration systems have been deployed across a multitude of industries, including the financial and banking sectors, transportation services, entertainment industries, insurance, healthcare, education, medicine, retail, and more. Handling and transforming such immense amounts of diverse data presents unique technical problems requiring distinct solutions because traditional data processing applications may not fully leverage and extract meaning from organizations' gargantuan and dispersed datasets, given their sheer scale.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for receiving customized functions via extension points that alter a data source state upon a change in a data orchestration system.

A data orchestration system may govern, gather, refine, and enrich various types, varieties, and volumes of data across an organization's distributed data landscape. A data orchestration system may cull data from various sources inside and outside of an organization. Such sources may include data lakes, data silos, message streams, relational databases, semi-structured data (CSV, logs, xml, etc.), unstructured data, binary data (images, audio, video, etc.), or other suitable stored data, both on premises and on the cloud. A data orchestration system may allow administrators to organize and manipulate data and to design and deploy user interfaces, i.e., scenes, in which users or customers may interact with the data, view derived analytics, investigate real-world happenstances, and perform other related, data-driven functions.

A data orchestration system may incorporate data processing pipelines to refine, analyze, and modify data in an organization's distributed data landscape. A data processing pipeline may be a set of data-transforming operations connected in a series or run in parallel. An exemplary data processing pipeline may convert data from one format to another, present visualizations, share data across applications, analyze video files using artificial intelligence, and perform many other functions, the breadth and extent of which will be understood by one skilled in the relevant art(s) to be expansive and extensive. In an embodiment, the datasets processed by data processing pipelines are very large, having thousands, millions, billions, or trillions (or more) records.

Operations in a data processing pipeline may be pre-defined or custom-built and may act upon the data sources in an appropriate fashion. Data processing pipelines including more than one operation may specify connections between operations. Thus, an operation may receive a data input, transform, modify, or otherwise operate upon the inputted data, and then pass the transformed data as output to a subsequent operation, component, scene, or user. An operation may have zero or more inputs and zero or more outputs. Operations may also run in parallel or in serial. Operations may process data partitioned across a container platform or clustered-data environment. An administrator may design custom operations or leverage standardized operations in order to build data pipelines in the data orchestration system.

A data orchestration system may present manipulated or raw data, derived analytics, related programs or modules, and other helpful information to users in a scene, i.e., a user interface designed to intelligently organize and display the results of and derivations from data pipelines. A scene may pull and organize data from various back-end sources, data repositories, operations, and other components within the data orchestration system. A data source may be thought of as having a state, i.e., the current composition, nature and characteristics of the data. Upon a change to the state, a data orchestration system may need to further modify, transform, or otherwise programmatically manipulate the state. In one embodiment, the data orchestration system may only pass a delta of changes to the state, and the modifications may be performed on the front-end to the delta. In an alternate embodiment, such modifications may occur before passing the state to the front-end and after passing the state to the front-end.

Accordingly, a need exists to allow a data orchestration system to offer extension points to modify data-source states in a pipeline in a data orchestration system.

Figure 1:
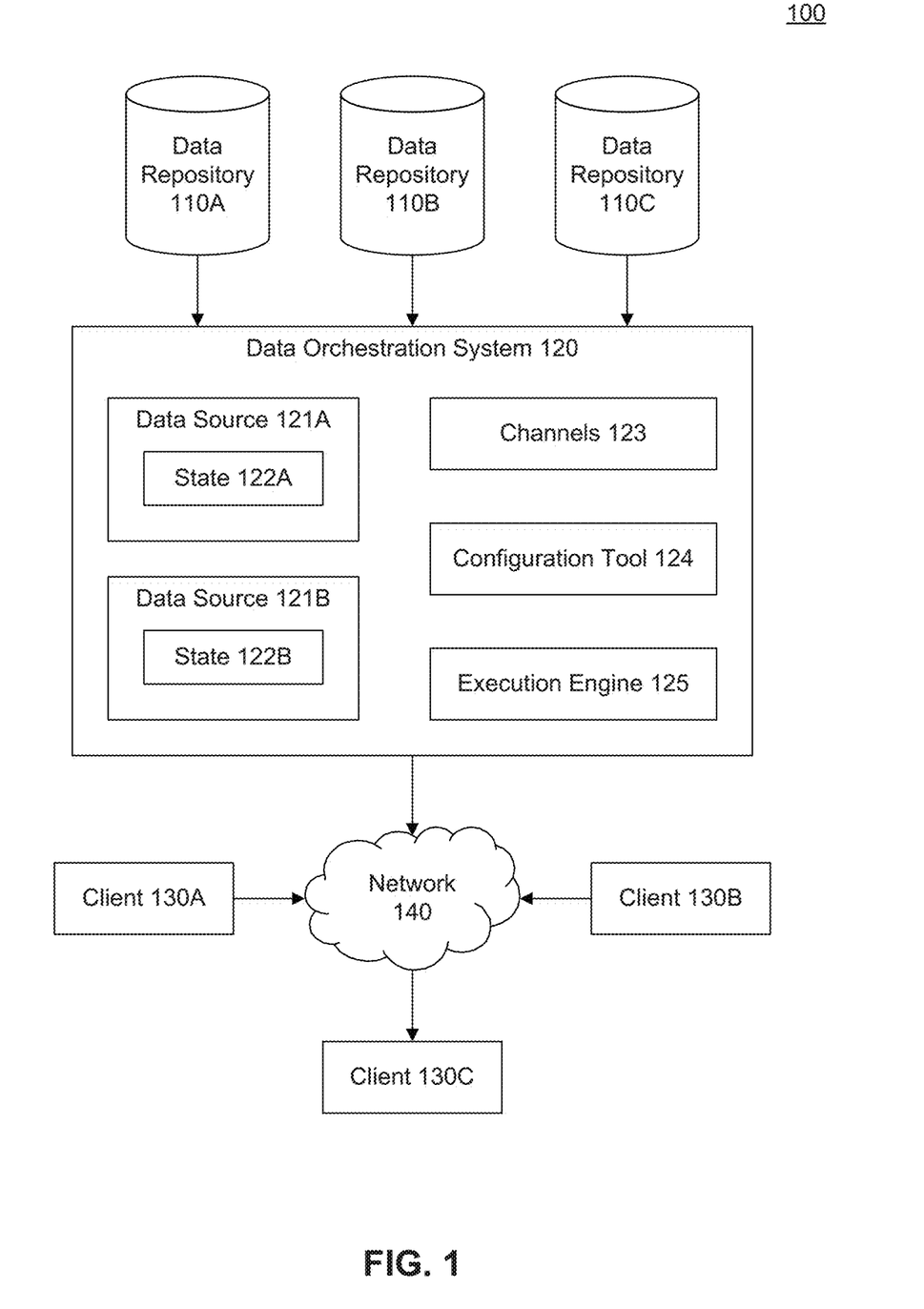
FIG. 1 is a block diagram of an environment including a data orchestration system, according to some embodiments.

FIG. 1 is a block diagram illustrating environment 100 including a data orchestration system, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 may include data repository 110, data orchestration system 120, client 130, and network 140.

Data repository 110 may be any of a panoply of data storage systems housing relevant data and information. Data repository 110 may be a database management system or relational database tool. Data repository 110 may further be a message queue or stream processing platform such as Apache Kafka or Apache Spark or other data storage systems like Apache Hadoop, HDFS, or Amazon S3, to name just a few examples. Data repository 110 may be a data lake, data silo, semi-structured data system (CSV, logs, xml, etc.), unstructured data system, binary data repository, or other suitable repository. Data repository 110 may store thousands, millions, billions, or trillions (or more) of objects, rows, transactions, records, files, logs, etc., while allowing for the creation, modification, retrieval, archival, and management of this data. In an embodiment, data repository 110 uses scalable, distributed computing to efficiently catalog, sort, manipulate, and access stored data.

Data orchestration system 120 includes source 121, data state 122, channels 123, configuration tool 124, and execution engine 125. Data orchestration system 120 may transform, convert, modify, manage, transfer, add to, subtract from, analyze or otherwise interact with data pulled from data repository 110. Data orchestration system 120 may display derived data to users in an appropriate user interface. Exemplary operations conducted within data orchestration system 120 may include: converting data from one format to another, preparing data for visualization, organizing the data, mining the data using regular expressions, natural language processors, or other mechanism, sharing data between different web applications, editing video/audio files, or any of a myriad of suitable interactions. In an embodiment, data orchestration system 120 executes these operations in real-time using parallel and distributed processing, channels, pipelines, and other big-data manipulation and processing techniques.

Data orchestration system 120 may incorporate data processing pipelines and other transformational approaches to provide advance analytics and intelligent data. Data orchestration system 120 may run various predefined or custom-built functions, referred to herein as operations, against the data to transform, organize, and analyze the data and/or perform additional programmatic functions harnessing the data. Data orchestration system 120 may present the manipulated (or raw) data, derived analytics, visualizations, and other results, as well as related programs and other data-driven functional modules, to users in a user interface, i.e., a scene. A scene may pull and organize data from various back-end sources and display derived results for one or more users, i.e., front-ends or clients, at any given time.

Source 121 may be configured in data orchestration system 120. Source 121 may be derived from a suitable data repository 110, either in a raw form or following (or at an intermediate step within) the application of a data pipeline. Such sources may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Data orchestration system 120 may allow data administrators to organize and manipulate the data and to design and provision suitable user interfaces, i.e. scenes, in which end-users may view formatted data and derived analytics determined based on source 121. Source 121 may incorporate data from multiple data repositories and sources including transformed data from other data sources, operations, and data pipelines.

In other embodiments, source 121 may generate data without interaction with a backend or ancillary data source, for example, by generating numbers in a set through random or algorithmic means.

Data state 122 may reflect current circumstances in source 121, in light of changes to data repository 110 and changes from clients in data orchestration system 120. In an embodiment, data state 122 may be represented by an appropriately formatted tuple, e.g., using JSON, XML, or other human-readable or machine-readable transfer protocol. When data state 122 changes, either based on a change to data repository 110 or the reception of an input from a input, data orchestration system 120 may propagate the changed data to other front-ends viewing the scene. In an embodiment, data orchestration system 120 transmits only a delta, i.e., the differences between a current state as compared to a previous state, of changed data in the state to the other front-ends to improve the efficiency of the transaction.

Channels 123 may be pipelines or connections between a backend, data sources, operations, scenes, and other components in data orchestration system 120. Channels 123 may transmit data using any suitable transfer protocol, communication protocol, or other mechanism. Channels 123 may provide a way to connect different, concurrent operations, functions, data sources, and data repositories, such as data repository 110. In an embodiment, channels 123 may specify a directional connection, i.e., either an inflow or outflow. However, channels 123 may also be bi-directional, i.e., used to both send and receive information.

Configuration tool 124 may allow a superuser, administrator, power user, etc. to configure data pipelines, operations, data sources, and other components within data orchestration system 120. Configuration tool 124 may present a suitable user interface to such an administrator to facilitate the creation of data pipelines and scenes, as described below with reference to FIGS. 2A-2B. In an embodiment, configuration tool 124 provides a visualization tool whereby a data administrator may visualize the data processing pipeline in graphical form. Configuration tool 124 may display operations, any connections between the operations, programming languages of each operation, and other appropriate details. Configuration tool 124 may provide a configuration panel through which an administrator may adjust the properties of a data source, operation, scene, and other components. Configuration tool 124 may allow an organization to enter a set of executable instructions or computer code and associate the set of executable instructions with a before-state-change extension point or an after-state-change extension point.

Execution engine 125 may compile, build, interpret, run, execute, or otherwise carry out sets of executable instructions stored in data orchestration system 120. Execution engine 125 may also facilitate transfer of stored executable instructions to client 130 for execution on client 130 to promote efficient transformations upon data-source changes. Execution engine 125 may associate the sets of executable instructions with a before-state-change extension point or an after-state-change extension point. When client 130 initially connects to data orchestration system 120 to view a scene, the entirety of the data source may need to be transferred. However, upon subsequent updates, only a changed value may transfer between the back-end and front-end for efficiency purposes. In this scenario, data orchestration system 120 may transfer the changed value to client 130, and client 130 may apply the executable instructions in the before-state-change extension point to the changed value on the client side by running the executable instructions contained in the before-state change extension point to derive a transformed value. Upon the initial establishment of a connection with a scene provided by data orchestration system 120, client 130 may retrieve an entire state of data source 306. In this scenario, execution engine 125 may apply the before-state-change extension point to the data source prior to transferring, or client 130 may apply the executable instructions in the before-state-change extension point after receiving the data. Execution engine 125 may execute a second set of executable instructions using the after-set-state extension point after a data-source change. In an alternate embodiment, data orchestration system 120 may process downstream user inputs via HTML updates or other manner of synchronizing a data model with a container.

Client 130 may be a personal digital assistant, desktop workstation, laptop or notebook computer, netbook, tablet, smart phone, mobile phone, smart watch or other wearable, appliance, part of the Internet-of-Things, and/or embedded system, to name just a few non-limiting examples, or any combination thereof. Client 130 may be a member of a business, organization, or other suitable group using data orchestration system 120 to intelligently manage their data landscape. A user of client 130 may be an individual, entity, user, customer, etc. using data-driven software applications. A user of client 130 may be a human being, but the user may also be an artificial intelligence construct. Although client 130 is illustrated in the example of FIG. 1 as a single computer, one skilled in the art(s) will understand that client 130 may represent two or more computers in communication with one another.

Network 140 may be any network or combination of networks including the Internet, a local area network (LAN), a wide area network (WAN), a wireless network, a cellular network, or various other types of networks as would be appreciated by a person of ordinary skill in the art. Client 130 may connect to data orchestration system 120 via network 140.

Figure 2A:
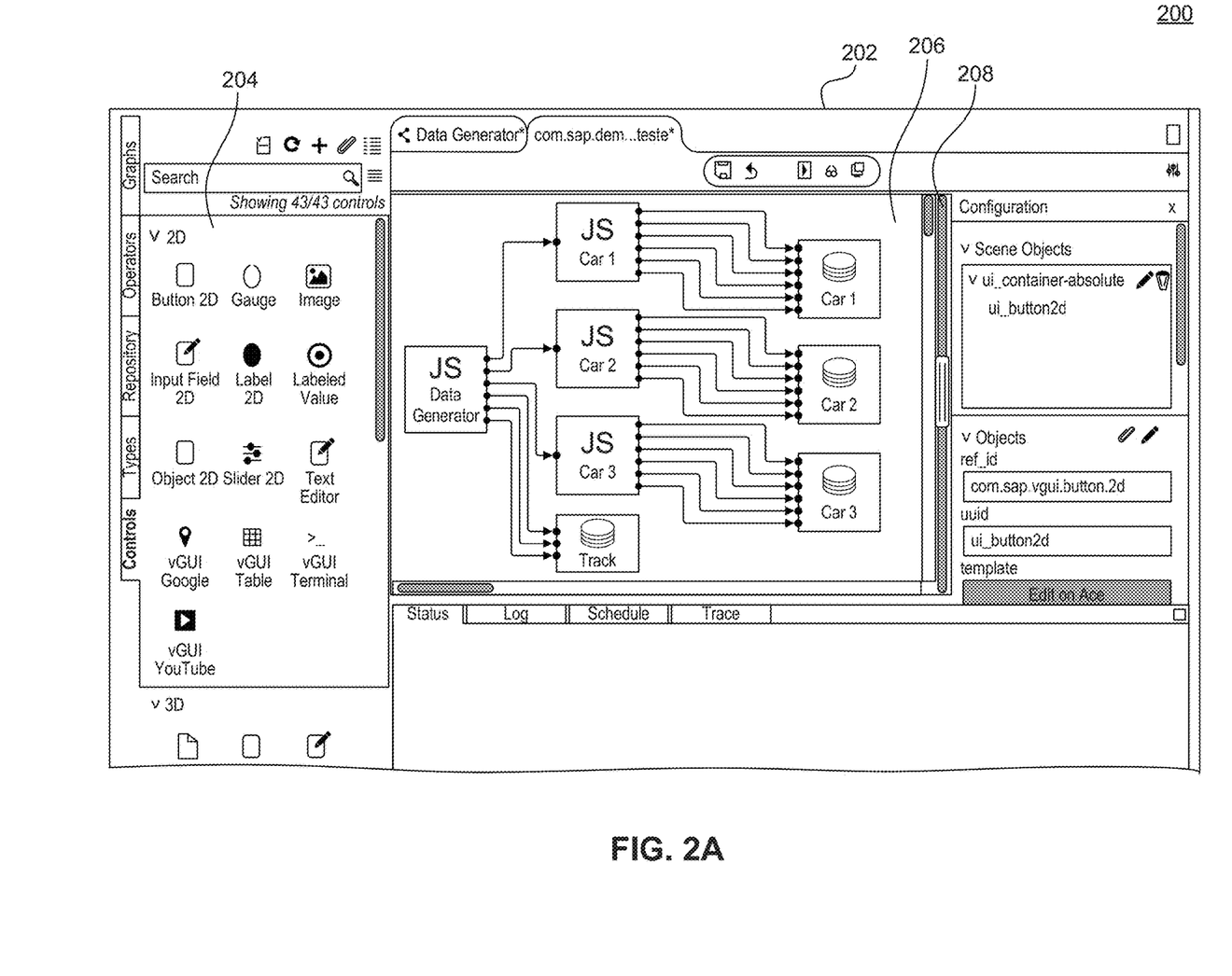
FIGS. 2A-2B are example screen displays of a data orchestration system, according to some embodiments.
Figure 2B:
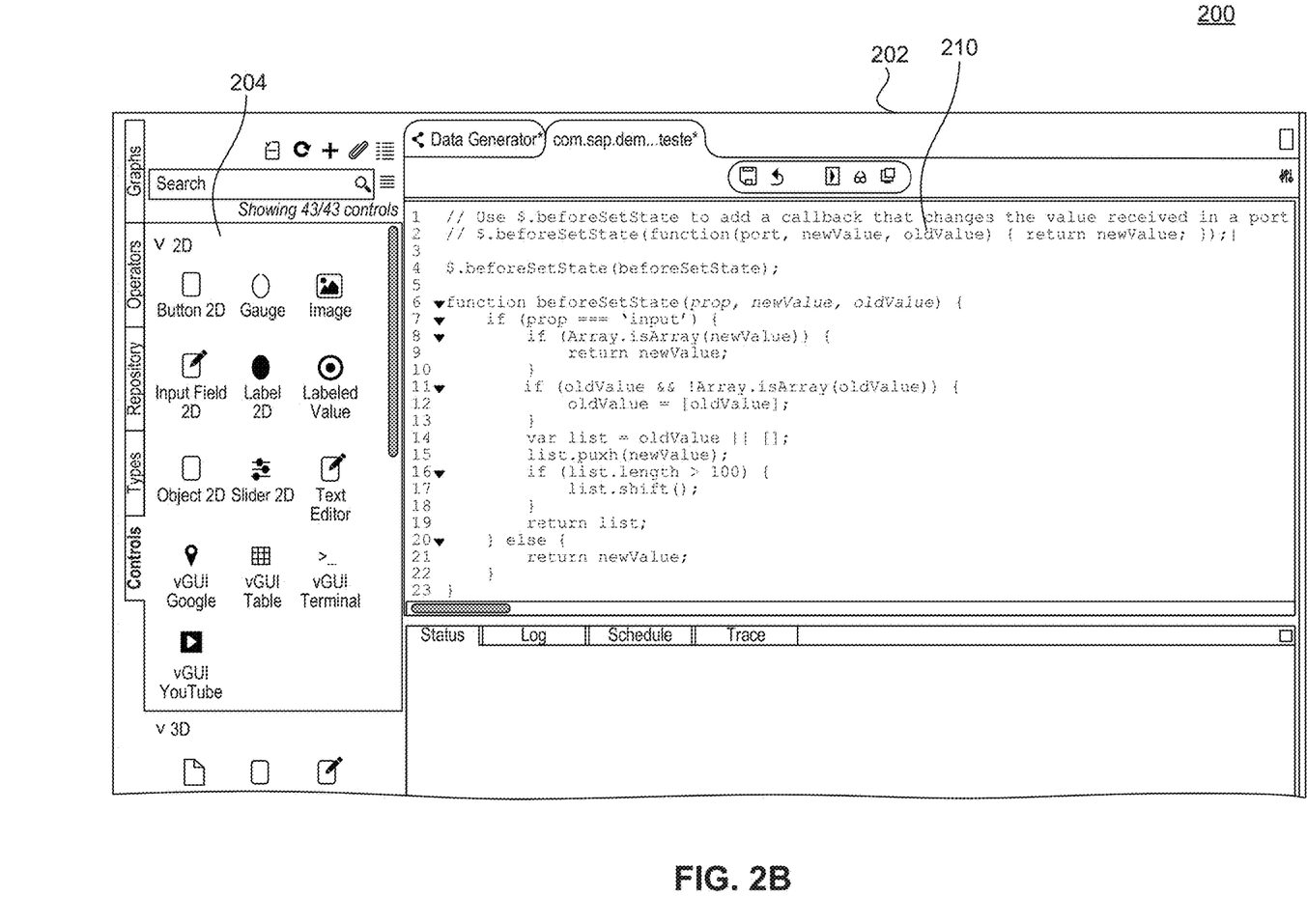

FIGS. 2A-2B are examples of screen display 200 in a data orchestration system, according to some embodiments. The screen displays provided in FIGS. 2A-2B are merely exemplary, and one skilled in the relevant art(s) will appreciate that many approaches may be taken to provide a suitable screen display 200 in accordance with this disclosure.

Data hub 202 may provide an interface through which an administrator or other appropriate user may configure pipelines, data sources, operations, executable instructions, and other components in data orchestration system 120. In an embodiment, data hub 202 includes a map view and a code-based view. Data hub 202 may further employ a drag-and-drop style design paradigm. Data hub 202 may include objects 204, panel 206, configuration details 208, and function 210.

Objects 204 may include various data repositories, such as data repository 110, connections, operations, data sources, such as source 121, and other tools and components used to build pipelines in data orchestration system 120. In an embodiment, objects 204 may be dragged and dropped in order to allow for the easy creation of a data pipeline by an administrator. Objects 204 may further include built, compiled or interpreted code and other forms of executable instructions.

Panel 206 may include data sources, transformative operators, scenes, connections between various elements, and other information related to a data pipeline currently being viewed. Panel 206 may display an output of an element acting as the input to another element. Panel 206 may provide a variety of mechanisms by which an administrator may edit and configure data pipelines, for example, by associating custom transformative functions with particular elements or transitions. Panel 206 may provide a diagram-based view or panel 206 may provide a code-based view.

Configuration details 208 may be details about an element in panel 206 being examined. Such details include the object name, the user ID, a template for the object, the type of the object, the height and width of the object, etc. In an embodiment, configuration details 208 may also include executable instructions entered by an administrator to perform additional transformative steps. The nature and exact parameters being displayed in configuration details 208 may vary based on the type of object selected.

Function 210 may be a function supplied provided by an administrator that performs transformational operations upon the state of a particular data source. For one example, function 210 may change the value received via a port. In an embodiment, a user may specify this extension point as "beforeSetState( )" or "afterSetState( )." The executable instructions provided in function 210 may subsequently be run by data orchestration system 120 to transform a data source upon reception of a state change.

In the merely exemplary embodiment provided in FIG. 2A, data hub 202 displays an exemplary data pipeline in data hub 202. This data pipeline may include a variety of possible data sources, objects, and operations for viewing and manipulation. Such a data pipeline is described in further detail below with reference to FIG. 3. Configuration details 208 display properties and parameters for a selected scene. This example is merely exemplary, however, and many suitable interfaces could be provided to accomplish similar functionalities.

In the merely exemplary embodiment provided in FIG. 2B, data hub 202 displays a function 210. In this embodiment, an administrator provided a "beforeSetState( )" function to execute upon a data source upon reception of a state change. This example is merely exemplary, however, and many suitable interfaces could be provided to accomplish similar functionalities.

Figure 3:
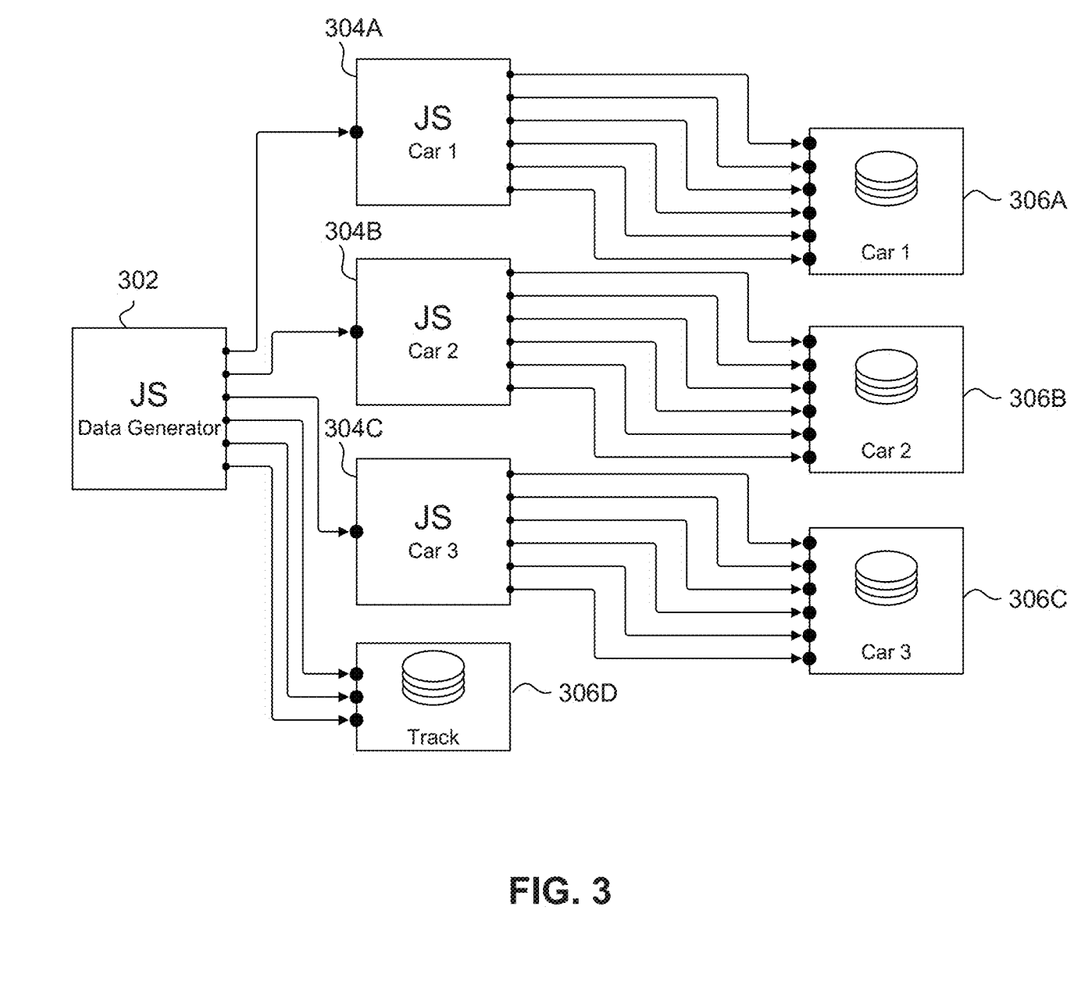
FIG. 3 is an example screen display of a data pipeline in a data orchestration system, according to some embodiments.

FIG. 3 is an example screen display 300 of a data pipeline in a data orchestration system, according to some embodiments. The screen display provided in FIG. 3 is merely exemplary, and one skilled in the relevant art(s) will appreciate that many approaches may be taken to provide a suitable screen display 300 in accordance with this disclosure.

Data generator 302 may be various sources of information located inside and outside of an organization. Data generator 302 may be a data lake, data silo, message stream, relational database, semi-structured data source (CSV, logs, xml, etc.), unstructured data, binary data (images, audio, video, etc.), or other suitable stored data.

Operation 304 may be predefined or custom-built and may act upon the data sources in an appropriate fashion. Operation 304 may receive a data input, transform, modify, or otherwise operate upon the inputted data, and then pass the transformed data as output to a subsequent operation, component, scene, or user. Operation 304 may have zero or more inputs and zero or more outputs. Operation 304 may run in parallel with other operations or in serial.

Data source 306 may be designed to intelligently organize and display the results of and derivations from data pipelines. Data source 306 may pull and organize data from various back-end sources, data repositories, data generators such as data generator 302, operations such as operation 304, and other components within the data orchestration system. Data source 306 may create a connection, store a state in the back-end, send initial values to connected front-ends, and apply after-state and before-state changes in the back-end.

In the merely exemplary embodiment provided in FIG. 3, data generator 302 feeds multiple operations: operation 304A, operation 304B, and operation 304C. These operations provide multiple inputs to data source 306A, 306B, and 306C. This example is merely exemplary, however, and many suitable interfaces could be provided to accomplish similar functionalities.

Figure 4:
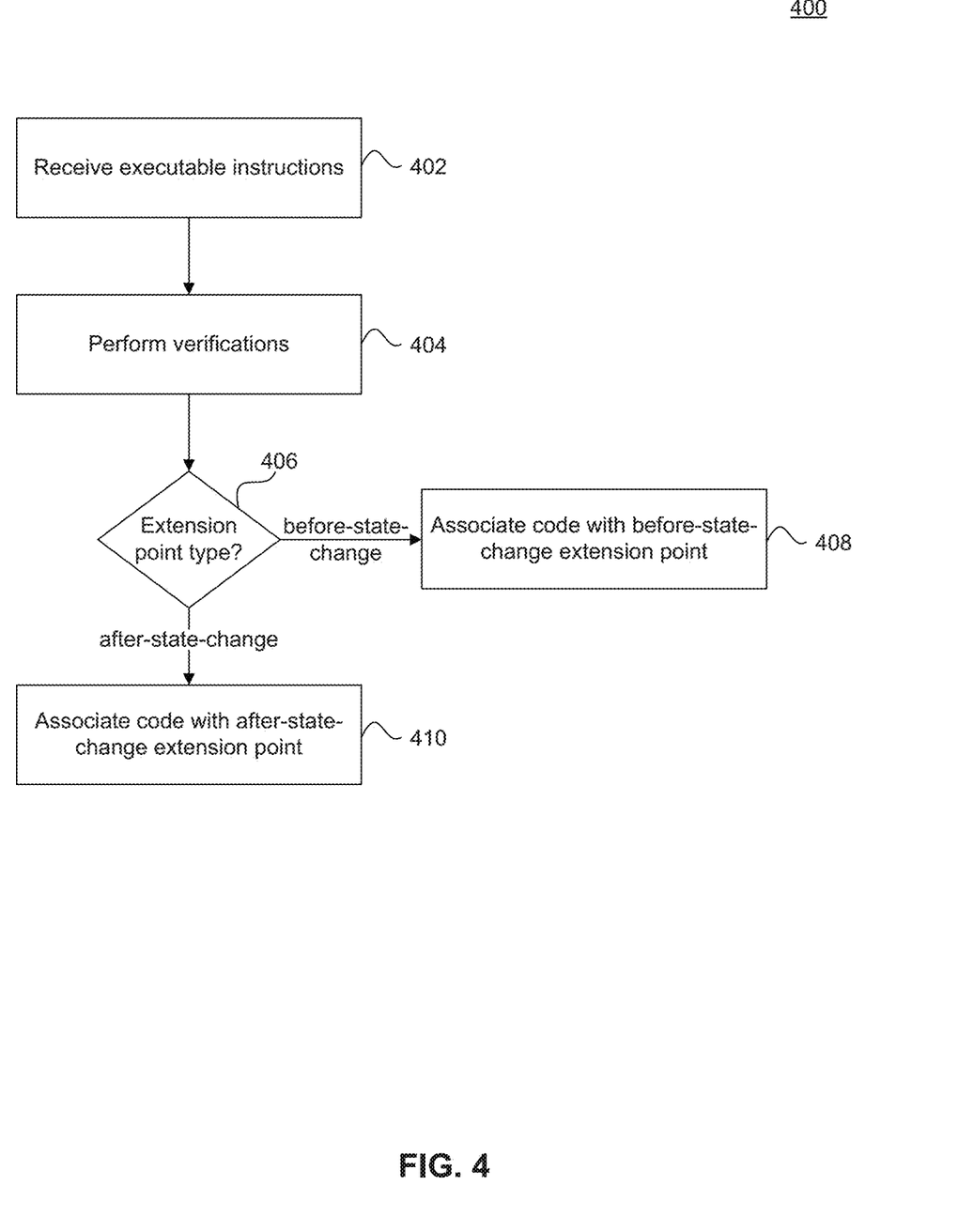
FIG. 4 is a flowchart illustrating a method of receiving a before-state-change or after-state-change extension point to apply to a state in a data orchestration system, according to some embodiments.

FIG. 4 illustrates a method 400 of a method of receiving a before-state-change extension point to apply to a state in a data orchestration system according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, data orchestration system 120 may receive executable instructions from an administrator to associate with a before-state-change or an after-state change extension point. Such executable instructions may be run or otherwise processed by execution engine 125 when a change to data state 122 is received by data orchestration system 120 before or after transmitting the changed state to a front-end viewing a scene or run locally on client 130 after receiving the delta of changed data. In an embodiment, data orchestration system 120 may receive the executable instructions as human-readable computer code, e.g., function 210, entered by an administrator in data hub 202. In one embodiment, the before-state-change extension point may be named "before-SetState( )," while the after-state-change extension point may be named "afterSetState( )." An administrator may write, edit, compile, modify, test, and deploy the code within configuration details 212 in configuration tool 124. In another embodiment, data orchestration system 120 may also receive the code as built, assembled, compiled, or executable object code via an appropriate upload. Data orchestration system 120 may receive the executable instructions in conjunction with a particular data source, for example data source 306, in a particular data pipeline, for example the data pipeline displayed in screen display 300. Data orchestration system 120 thus may associate the executable instructions with a particular scene or a particular data state feeding a particular scene. In one merely exemplary use case, an administrator may enter executable instructions for a before-state-change extension point that aggregates, condenses, or trims data received from source 121 before passing the data to data source 306 as a fixed-length array when sending an initial state. In another merely exemplary use case, an administrator may enter executable instructions for a before-state-change extension point to execute on client 130 to manipulate or transform a delta of changed data upon a change to the data source, where only the changes to the data source are passed to client 130. Example code for such an exemplary use case may resemble:

```
function beforeSetState(prop, newValue, oldValue) {
    if (prop === 'input') {
```

-continued

```
        if (Array.isArray(newValue)) {
            return newValue;
        }
        if (oldValue&& !Array.isArray(oldValue)) {
            oldValue = [oldValue];
        }
        var list = oldValue || [ ];
        list.push(newValue);
        if (list.length > 100) {
            list.shift( );
        }
        return list;
    }
    else {
        return newValue;
    }
}
```

In another merely exemplary use case, an administrator may enter executable instructions associated with an after-state-change extension point that processes downstream inputs from a scene. Example code for such an exemplary use case may resemble:

```
function afterSetState (prop, value) {
    switch (prop) {
        case 'input':
            updateDate(value);
            break;
        case 'type':
            type = types[value];
            init( );
            break;
    }
}
```

One skilled in the relevant art(s) will appreciate that the breadth and scope of functionalities accessible and creatable using after-state-change and before-state-change extension points is broad and substantial, and the above examples are not meant to limit the expanse of available executable instructions.

In 404, data orchestration system 120 may verify that the executable instructions entered in 402 are syntactically, semantically, and/or otherwise appropriate. For example, data orchestration system 120 may compile or interpret the executable instructions and display resulting errors or warnings to an administrator. In an embodiment, data orchestration system 120 may perform an automated security analysis to ensure that the executable instructions adhere to appropriate security requirements. Data orchestration system 120 may apply coding standards by critiquing entered executable instructions in order to adhere with coding best practices. Data orchestration system 120 may perform additional analyses or enforcement mechanisms to ensure the viability of entered code.

In 406, data orchestration system 120 may determine the type of extension point that the executable instructions entered in 402 are to be associated with. In an embodiment, the extension point may be a before-state-change extension point or an after-state-change extension point. If the received executable instructions are to be associated with a before-state-change extension point, then method 400 proceeds to 408. If the received executable instructions are to be associated with an after-state-change extension point, then method 400 proceeds to 410.

In 408, data orchestration system 120 may store the executable instructions for processing and/or run by execution engine 125 and associate the executable instructions with an appropriate scene and data source, recording that the executable instructions are a before-state-change extension point. Upon reception of a change to the state, data orchestration system 120 may cause the executable instructions to be run on client 130 or run or process the executable instructions prior to transmitting the changed state to the scene, as described in further detail below with reference to FIG. 5.

In 410, data orchestration system 120 may store the executable instructions for processing and/or run by execution engine 125 and associate the executable instructions with an appropriate scene and data source, recording that the executable instructions are an after-state-change extension point. Upon reception of a change to the state, data orchestration system 120 may run or process the executable instructions prior to transmitting the changed state to the scene, as described in further detail below with reference to FIG. 5.

Figure 5:
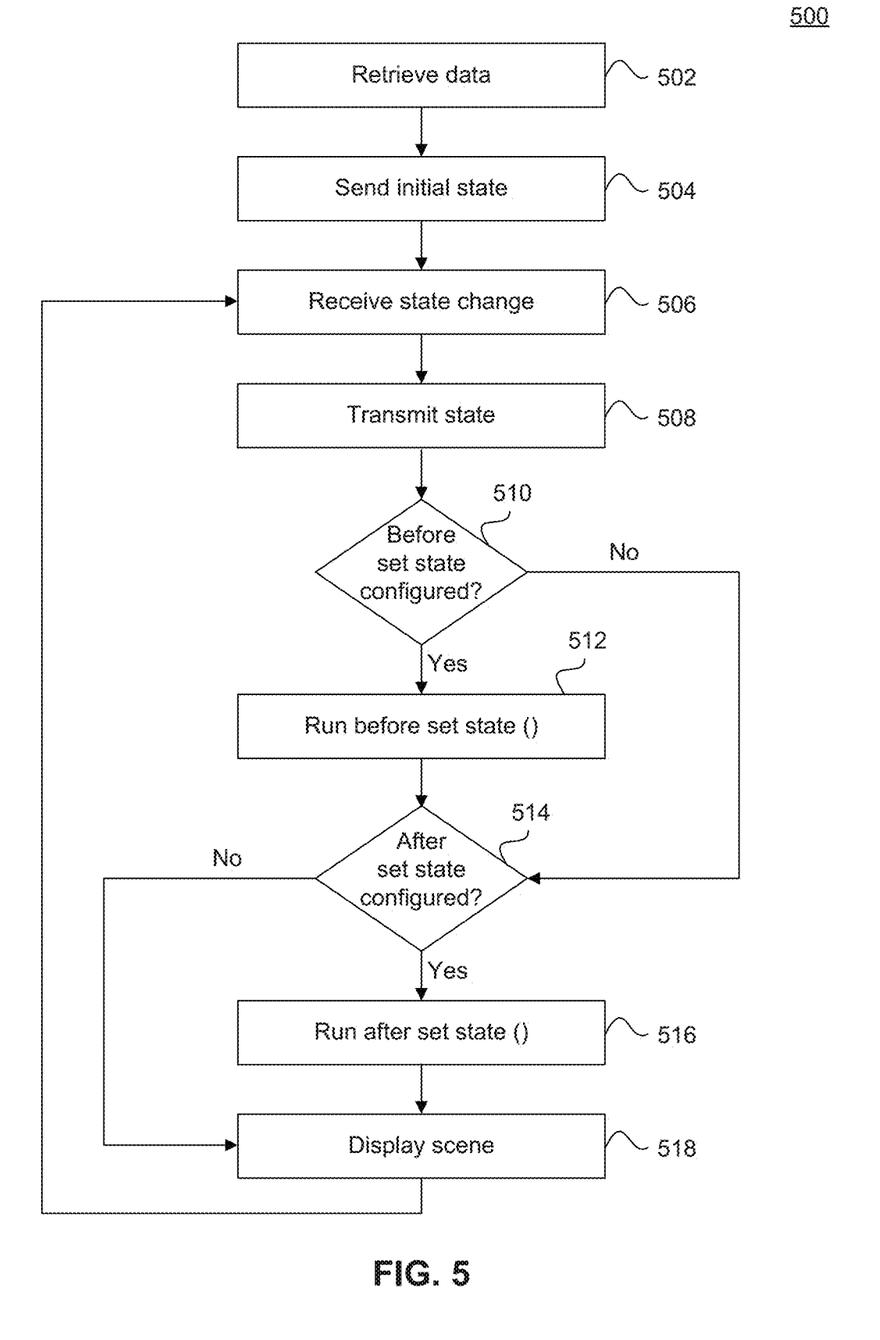
FIG. 5 is a flowchart illustrating a method of applying executable instructions to a state when processing a state change for a data source used in a scene in a data orchestration system, according to some embodiments.

FIG. 5 illustrates a method 500 of applying executable instructions to a state when processing a state change for a data source used in a scene in a data orchestration system, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, data orchestration system 120 may retrieve data from data repository 110 as source 121. Data orchestration system 120 may perform transformational or programmatic actions to modify the retrieved data in a myriad of fashions, based on data pipelines, and operations specified in configuration tool 124. In an embodiment, data orchestration system 120 may retrieve data from data repository 110 via channels 123. In an alternate embodiment, data orchestration system 120 may retrieve data through or via an appropriate application programming interface or other means of interacting with data repository 110. Data orchestration system 120 may determine an initial state, e.g., data state 122 based on the particularities of source 121 and any transformation steps performed on the data, for example, by retrieving an appropriate number of rows and columns from a database table.

In 504, data orchestration system 120 may send or transmit the initial state determined in 502 to one or more front-ends viewing a data source, such as data source 306. One or more clients, such as client 130, may receive the initial state from data orchestration system 120 and render or otherwise display representations of or derivations from the initial state for a user of client 130. In an embodiment, the initial state may be transferred to client 130 using an open websocket connection. The initial state may be stored, written, and/or relayed in JSON, XML, or other appropriate human and/or machine readable transfer protocol. In an alternate embodiment, the initial state may be reflected by any suitable Javascript variable and any suitable type, for example, Booleans, numbers, strings, arrays, structures, and advanced object types such as images, audio files, and videos. In one embodiment, data orchestration system 120 may apply stored executable instructions to the initial state prior to transmitting the initial state to clients.

In 506, data orchestration system 120 may receive a change to the state from data repository 110. In an embodiment, data orchestration system 120 may receive the change via channels 123. For example, if data repository 110 is a database server, a front-end application that writes to the database server may make a change to the database, for example, the addition of a row into a table. In another example, if data repository 110 is a data lake, a batch of transactions may be added to the data lake based on recent system usage. When the change occurs, data repository 110 may communicate the change to data orchestration system 120, and data orchestration system 120 may update any impacted data pipelines, data sources, and scenes. In another illustrative example, source 121 may generate a set of numbers without accessing an ancillary data repository, and the change to source 121 and data state 122 in this instance may be an addition of another number in the set of data stored in source 121.

In 508, data orchestration system 120 may transmit the changed state to one or more clients, such as client 130, that may be concurrently connected to data orchestration system 120. Data orchestration 120 may provide transformations individually for each individual client 130, i.e., different clients may derive different insights from the same data source. Data orchestration system 120 may transmit only a delta of changes as the changed state for application on client 130. In an embodiment, the changed state may be transferred to client 130 using an open websocket connection. The changed state may be stored, written, and/or relayed in JSON, XML, or other appropriate human and/or machine readable transfer protocol. In an alternate embodiment, the changed state may be reflected by any suitable Javascript variable and any suitable type, for example, Booleans, numbers, strings, arrays, structures, and advanced object types such as images, audio files, and videos.

In 510, data orchestration system 120 may determine if a before-state-change extension point was configured in configuration tool 124, as described above with reference to FIG. 4. If a before-state-change extension point exists in data orchestration system 120, then method 500 proceeds to 512. If no before-state-change extension point exists, then method 500 proceeds to 514.

In 512, data orchestration system 120 may employ execution engine 125 to process, execute, perform, or otherwise carry out the executable instructions associated with the before-state-change extension point configured to and associated with the changed data source. In one embodiment, execution engine 125 may cause client 130 to run the executable instructions against the received changed state (i.e., the delta of changes) to perform configured executable instructions efficiently on the client side. For example, data orchestration system 120 may store the data in a fixed-length array, where the length of the array is equal to the number of data points displayed or otherwise used within data source 306, and client 130 may add a record received as a delta to the fixed-length array before rendering a scene viewing the fixed-length array. In another embodiment, data orchestration system 120 may employ execution engine 125 to trim, cull, or process the data received from data repository 110 prior to passing the data to client 130 as source 121 for downstream rendering in a scene.

In 514, data orchestration system 120 may determine if an after-state-change extension point was configured in configuration tool 124, as described above with reference to FIG. 4. If an after-state-change extension point exists in data orchestration system 120, then method 500 proceeds to 516. If no after-state-change extension point exists, then method 500 proceeds to 518.

In 516, data orchestration system 120 may employ execution engine 125 to process, execute, perform, or otherwise carry out the executable instructions associated with the after-state-change extension point for the changed data source. In one embodiment, data orchestration system 120 may process additional inputs received from client 130 via the after-state-change extension point to perform further modifications to source 121 based on user input.

In 518, data orchestration system 120 may display an updated data source 306 on front-ends viewing a scene, such as client 130. In an embodiment, client 130 may apply the state change to a local scene to allow the user to see the change in real-time. After displaying a scene for viewing by one or more front-ends, method 500 may return to 506 to await the reception of additional state changes. Thus, a program execution may be iterative, and data orchestration system 120 may continue to process state changes, transmit changed states and deltas to client 130, and cause client 130 to apply before-state-change and after-state-change functions until stopped by a user, an error crashes, or execution otherwise completes. One skilled in the arts will appreciate that the open-ended nature of the executable instructions received and associated with the before-state-change and after-state-change extension points may support a broad variety of functionalities.

Figure 6:
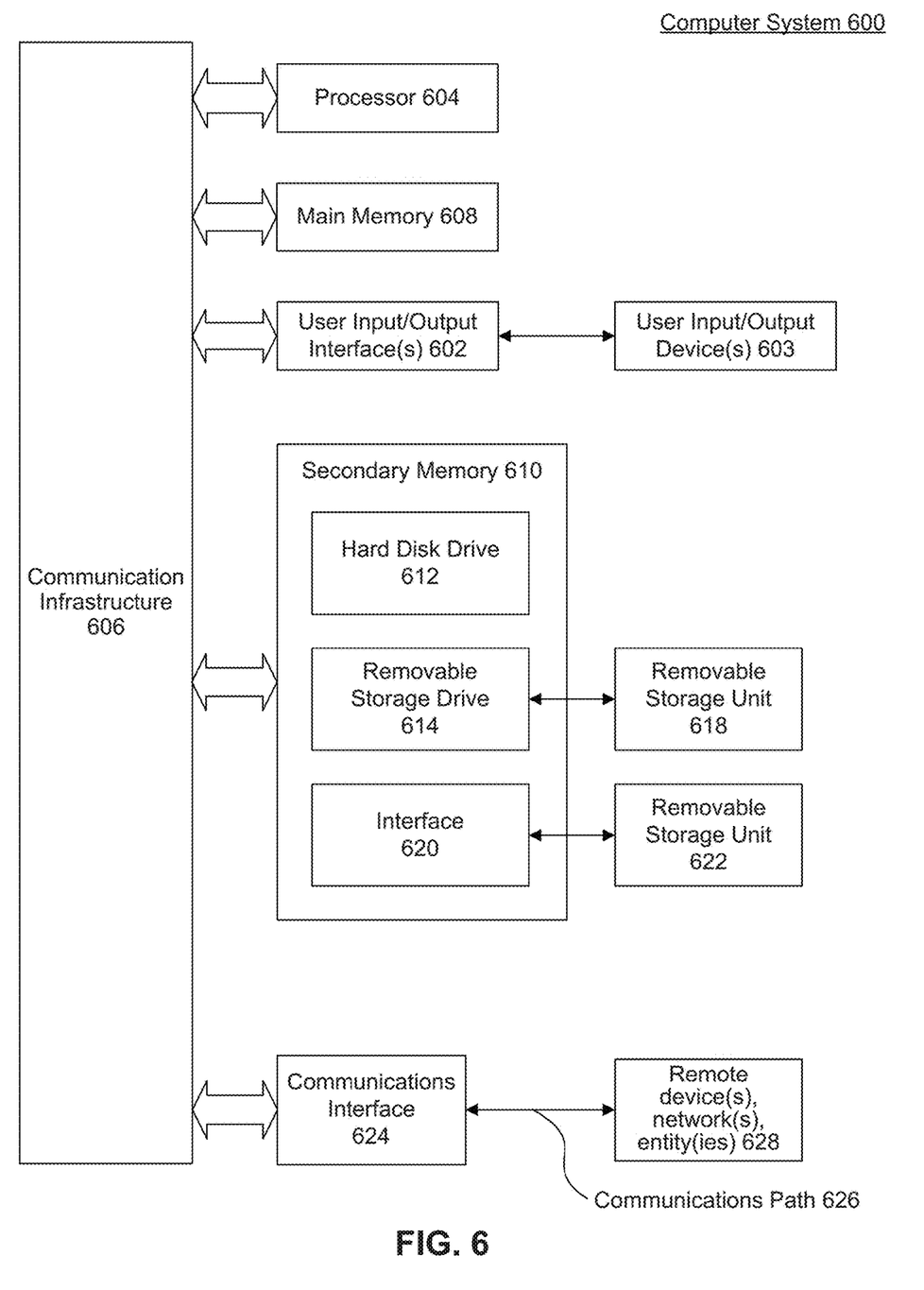
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

associating, by one or more processors, a before-state-change extension point comprising a first set of executable instructions with a data source in a data orchestration system, wherein the first set of executable instructions are received in a configuration tool provided by the data orchestration system;

sending, by the one or more processors, an initial state reflecting the data source to a front-end;

receiving, by the one or more processors, a modification to the initial state from a data repository based upon the data source and transformation steps performed on data;

determining, by the one or more processors, a changed state, wherein the changed state comprises a delta of changes representing the modification to the initial state based upon a change to the data source in light of changes in the data repository;

sending, by the one or more processors, the delta of changes and the first set of executable instructions to the front-end;

performing, by the one or more processors, one or more transformational operations on the transformed state in a data processing pipeline; and causing, by the one or more processors, the front-end to execute the first set of executable instructions against the changed state after receiving the delta of changes to derive a transformed state and display the transformed state.

2. The method of claim 1, further comprising:

associating, by the one or more processors, an after-state-change extension point comprising a second set of executable instructions with the data source; and causing, by the one or more processors, the front-end to execute the second set of executable instructions after displaying the transformed state.

3. The method of claim 1, further comprising:

determining, by the one or more processors, that the first set of executable instructions was configured; and causing, by the one or more processors, the front-end to render the transformed state for view in a scene.

4. The method of claim 1, further comprising:

determining, by the one or more processors, that the first set of executable instructions was not configured and causing, by the one or more processors, the front-end to render the changed state for view in a scene.

5. The method of claim 1, the receiving further comprising:

binding, by the one or more processors, the initial state to an HTML, element;

receiving, by the one or more processors, an interaction with an element in a scene displayed on the front-end; and determining, by the one or more processors, the changed state based on the interaction.

6. The method of claim 1, further comprising:

performing, by the one or more processors, a data-transforming operation on the data source as specified in a data processing pipeline designed in the configuration tool.

7. The method of claim 1, further comprising:

causing, by the one or more processors, the front end to simultaneously display data from a second data source with the transformed state.

8. A system, comprising:

a memory; and at least one processor coupled to the memory and configured to:

associate a before-state-change extension point comprising a first set of executable instructions with a data source in a data orchestration system, wherein the first set of executable instructions are received in a configuration tool provided by the data orchestration system;

send an initial state reflecting the data source to a front-end;

receive a modification to the initial state from a data repository based upon the data source and transformation steps performed on data;

determine a changed state, wherein the changed state comprises a delta of changes representing the modification to the initial state based upon a change to the data source in light of changes in the data repository;

send the delta of changes and the first set of executable instructions to the front-end;

perform one or more transformational operations on the transformed state in a data processing pipeline; and cause the front-end to execute the first set of executable instructions against the changed state after receiving the delta of changes to derive a transformed state and display the transformed state.

9. The system of claim 8, the at least one processor further configured to:

associate an after-state-change extension point comprising a second set of executable instructions with the data source; and cause the front-end to execute the second set of executable instructions after displaying the transformed state.

10. The system of claim 8, the at least one processor further configured to:

determine that the first set of executable instructions was configured; and cause the front-end to render the transformed state for viewing in a scene.

11. The system of claim 8, the at least one processor further configured to:

determine that the first set of executable instructions was not configured; and cause the front-end to render the changed state for view in a scene.

12. The system of claim 8, wherein to receive the changed state, the at least one processor is configured to:

bind the initial state to an HTML element;

receive an interaction with an element in a scene displayed on the front-end; and determine the changed state based on the interaction.

13. The system of claim 8, the at least one processor further configured to:

perform a data-transforming operation on the data source as specified in a data processing pipeline designed in the configuration tool.

14. The system of claim 8, the at least one processor further configured to:

cause the front end to simultaneously display data from a second data source with the transformed state.

15. A non-transitory computer-readable device having instructions stored thereon that, when executed by at least one computing device, cause the at least one computing device to perform operations comprising:

associating a before-state-change extension point comprising a first set of executable instructions with a data source in a data orchestration system, wherein the first set of executable instructions are received in a configuration tool provided by the data orchestration system;

sending an initial state reflecting the data source to a front-end;

receiving a modification to the initial state from a data repository based upon the data source and transformation steps performed on data;

determining a changed state, wherein the changed state comprises a delta of changes representing the modification to the initial state based upon a change to the data source in light of changes in the data repository;

sending the delta of changes and the first set of executable instructions to the front-end;

performing one or more transformational operations on the transformed state in a data processing pipeline; and causing the front-end to execute the first set of executable instructions against the changed state after receiving the delta of changes to derive a transformed data state and display the transformed state.

16. The non-transitory computer-readable device of claim 15, the operations further comprising:

associating an after-state-change extension point comprising a second set of executable instructions with the data source; and causing the front-end to execute the second set of executable instructions after displaying the transformed state.

17. The non-transitory computer-readable device of claim 15, the operations further comprising:

determining that the first set of executable instructions was not configured;

causing the front-end to render the changed state for view in a scene.

18. The non-transitory computer-readable device of claim 15, the operations further comprising:

binding the initial state to an HTML, element;

receiving an interaction with an element in a scene displayed on the front-end; and determining the changed state based on the interaction.

19. The non-transitory computer-readable device of claim 15, the operations further comprising:

performing a data-transforming operation on the data source as specified in a data processing pipeline designed in the configuration tool.

20. The non-transitory computer-readable device of claim 15, the operations further comprising:

causing the front end to simultaneously display data from a second data source with the transformed state.

* * * * *